US008111326B1

(12) United States Patent
Talwar

(10) Patent No.: US 8,111,326 B1
(45) Date of Patent: Feb. 7, 2012

(54) POST-CAPTURE GENERATION OF SYNCHRONIZATION POINTS FOR AUDIO TO SYNCHRONIZE VIDEO PORTIONS CAPTURED AT MULTIPLE CAMERAS

(75) Inventor: Abhishek Talwar, New Delhi (IN)

(73) Assignee: Adobe Systems Incorporated, San Jose, CA (US)

(*) Notice: Subject to any disclaimer, the term of this patent is extended or adjusted under 35 U.S.C. 154(b) by 1294 days.

(21) Appl. No.: 11/805,830

(22) Filed: May 23, 2007

(51) Int. Cl.
*H04N 5/04* (2006.01)
*H04N 7/14* (2006.01)
*H04N 7/20* (2006.01)
*H04N 5/932* (2006.01)
*H04N 5/93* (2006.01)
*G06F 1/12* (2006.01)
*G01C 21/00* (2006.01)

(52) U.S. Cl. .......... 348/500; 348/14.08; 348/423.1; 725/67; 713/400; 701/215; 386/201; 386/203; 386/282

(58) Field of Classification Search .......... None
See application file for complete search history.

(56) References Cited

U.S. PATENT DOCUMENTS

| | | | |
|---|---|---|---|
| 5,479,351 A | 12/1995 | Woo et al. | |
| 6,430,361 B2 | 8/2002 | Lee | |
| 6,839,067 B2 | 1/2005 | Liu et al. | |
| 6,972,787 B1 | 12/2005 | Allen et al. | |
| 6,993,246 B1 | 1/2006 | Pan et al. | |
| 7,015,954 B1 | 3/2006 | Foote et al. | |
| 7,024,575 B2 | 4/2006 | Lienhart et al. | |
| 7,057,663 B1 * | 6/2006 | Lee | 348/423.1 |
| 7,126,630 B1 | 10/2006 | Lee et al. | |
| 2001/0036356 A1 | 11/2001 | Weaver et al. | |
| 2002/0018124 A1 | 2/2002 | Mottur et al. | |
| 2005/0024488 A1 | 2/2005 | Borg | |
| 2005/0206720 A1 * | 9/2005 | Cheatle et al. | 348/14.08 |
| 2006/0002690 A1 | 1/2006 | Stwertka et al. | |
| 2006/0248559 A1 | 11/2006 | Michener et al. | |
| 2007/0035632 A1 | 2/2007 | Silvernail et al. | |

FOREIGN PATENT DOCUMENTS

EP 1199892 4/2002

* cited by examiner

*Primary Examiner* — Jefferey Harold
*Assistant Examiner* — Sean Haiem
(74) *Attorney, Agent, or Firm* — Robert C. Kowert; Meyertons, Hood, Kivlin, Kowert & Goetzel, P.C.

(57) ABSTRACT

Embodiments of the invention relate generally to computing devices and systems, software, computer programs, applications, and user interfaces, and more particularly, to synchronizing portions of video as a function of the post-capture generation of synchronization points for audio, the portions of video being captured at multiple cameras.

23 Claims, 12 Drawing Sheets

POST-CAPTURE GENERATION OF SYNCHRONIZATION POINTS FOR AUDIO TO SYNCHRONIZE VIDEO PORTIONS CAPTURED AT MULTIPLE CAMERAS

FIELD OF THE INVENTION

Embodiments of the invention relate generally to computing devices and systems, software, computer programs, applications, and user interfaces, and more particularly, to synchronizing portions of video as a function of the post-capture generation of synchronization points for audio, the portions of video being captured at multiple cameras.

BACKGROUND OF THE INVENTION

When editing audio and video captured by multiple cameras, traditional media editing applications typically operate on the premise that audio portions captured at different cameras angles are coextensive with the captured video and align at a common point in time. But this is often not the case. In practice, the spatial arrangement of the multiple cameras, as well as the environment, contribute to deviations in audio relative to some point in time. These deviations, which can be as small as a fraction of a second, can lead to two or more captured audio portions being out of synchronization as perceived, for example, by a human listener.

FIG. 1A illustrates a multi-camera arrangement 100 for capturing video and audio of a subject 108 at different angles and positions. As shown, capture devices 102a, 102b, and 102c, which are typically cameras, are arranged at different angles A1, A2, and A3 relative to reference 110. Further, these capture devices are positioned at different distances, D1, D2, and D3 in space from subject 108. In this typical multi-camera arrangement 100, these angles and distances, as well as other various factors, such as the occurrence of ambient noise 104 near capture device 102a, affect the synchronization (and/or the quality) of the audio portions as they are captured.

One common technique for synchronizing the video captured at capture devices 102a, 102b, and 102c is to implement time codes associated with each video (or otherwise use some sort of global synchronization signal) to synchronize both the video and audio portions. In particular, a user is usually required to manually adjust the different videos to bring their time codes into agreement. A time code normally describes the relative progression of a video images in terms of an hour, minute, second, and frame (e.g., HH:MM:SS:FR). But a drawback to using time codes to synchronize audio requires the user to synchronize different video portions to a particular frame before synchronizing the audio portions. The effort to synchronize the audio is further exacerbated due to the number of samples of audio sound that is captured relative to the number of video frames. Typically, for each frame of video (e.g., 30 frames per second), there are 1,600 samples of audio (e.g., 48,000 samples per second). As such, audio portions for capture devices 102a, 102b, and 102c are typically synchronized based on the video portions and their time codes, which can contribute to undesired sound delays and echoing effects. Another common technique for synchronizing the audio (and the video) captured at capture devices 102a, 102b, and 102c is to use a clapper to generate a distinctive sound during the capture of the audio and video. A clapper creates an audible sound—as a reference sound—to synchronize audio during the capture of the audio. The clapper sound is used for editing purposes and is discarded during editing. Consider that a clapper (not shown) generates a sound ("noise") 104 for capture by capture devices 102a, 102b, and 102c. Thus, clapper noise 104 can be used to synchronize the audio. A drawback to using clapper noise 104 to synchronize audio is that the distance from noise and capture devices 102a, 102b, and 102c can cause delays that hinder synchronization of the audio relating to scene 108.

FIG. 1B illustrates a typical work flow to integrate indicia, such as time codes and clapper sounds, within the audio or video for synchronization purposes prior to and/or during the capture of video using a multi-camera arrangement. As shown, a typical work flow to film a scene 108 (FIG. 1A) includes the stages of pre-production 140 (i.e., prior to capturing video and audio), production 142 (i.e., the capturing of video and audio), and post-production 144 (i.e., subsequent to capturing video and audio). In a pre-production stage 140 of capturing video, common synchronization techniques usually require that a user procure either time code generation hardware or a clapper, or both, before the video and audio is captured. In a production stage 142, common synchronization techniques usually require that a user implement time codes or a clapper to introduce points at which to synchronize video during the capture of the video and audio. In a post-production stage 144, a user normally uses the common synchronization techniques of the pre-production 140 and production 142 stages to synchronize the video. The time codes and clapper sounds require removal as they are intended for editing purposes and are distracting to an audience if time codes remain visible and clapper sounds remain audible in the final product.

It would be desirable to provide improved computing devices and systems, software, computer programs, applications, and user interfaces that minimize one or more of the drawbacks associated with conventional techniques for synchronizing either audio or video, or both.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
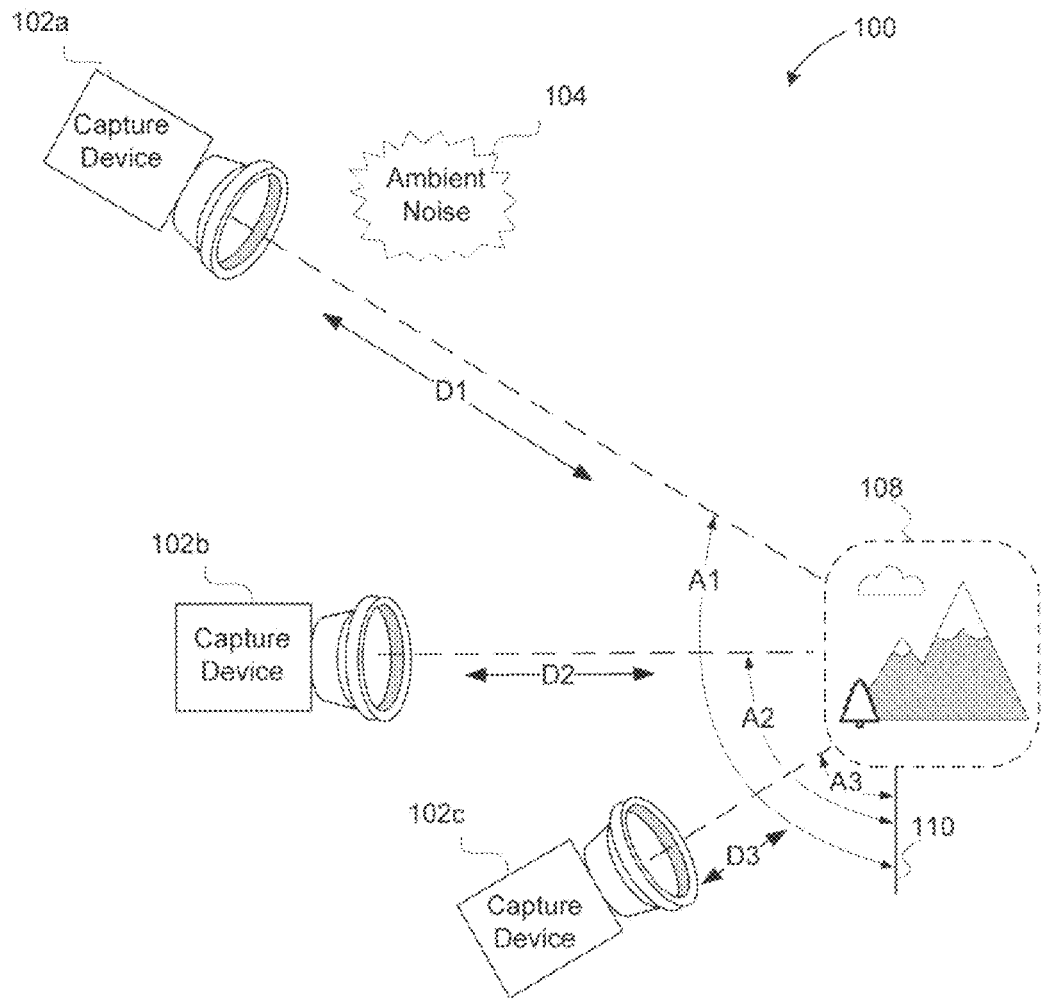
FIG. 1A illustrates a multi-camera arrangement for capturing video and audio of a subject at different angles and positions.
Figure 1B:
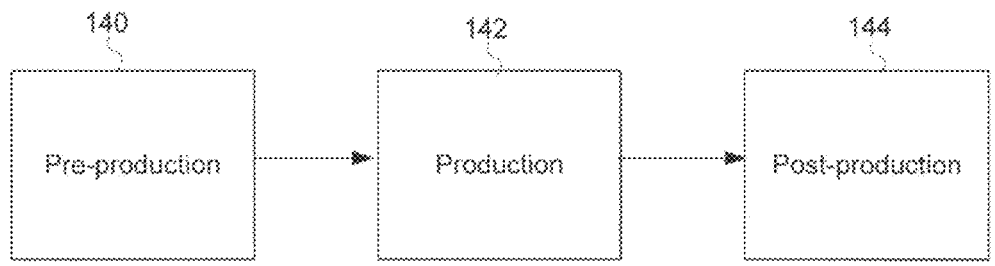
FIG. 1B illustrates a typical work flow to integrate indicia in connection the audio or video for synchronization purposes prior to and/or during the capture of video using a multi-camera arrangement.
Figure 2A:
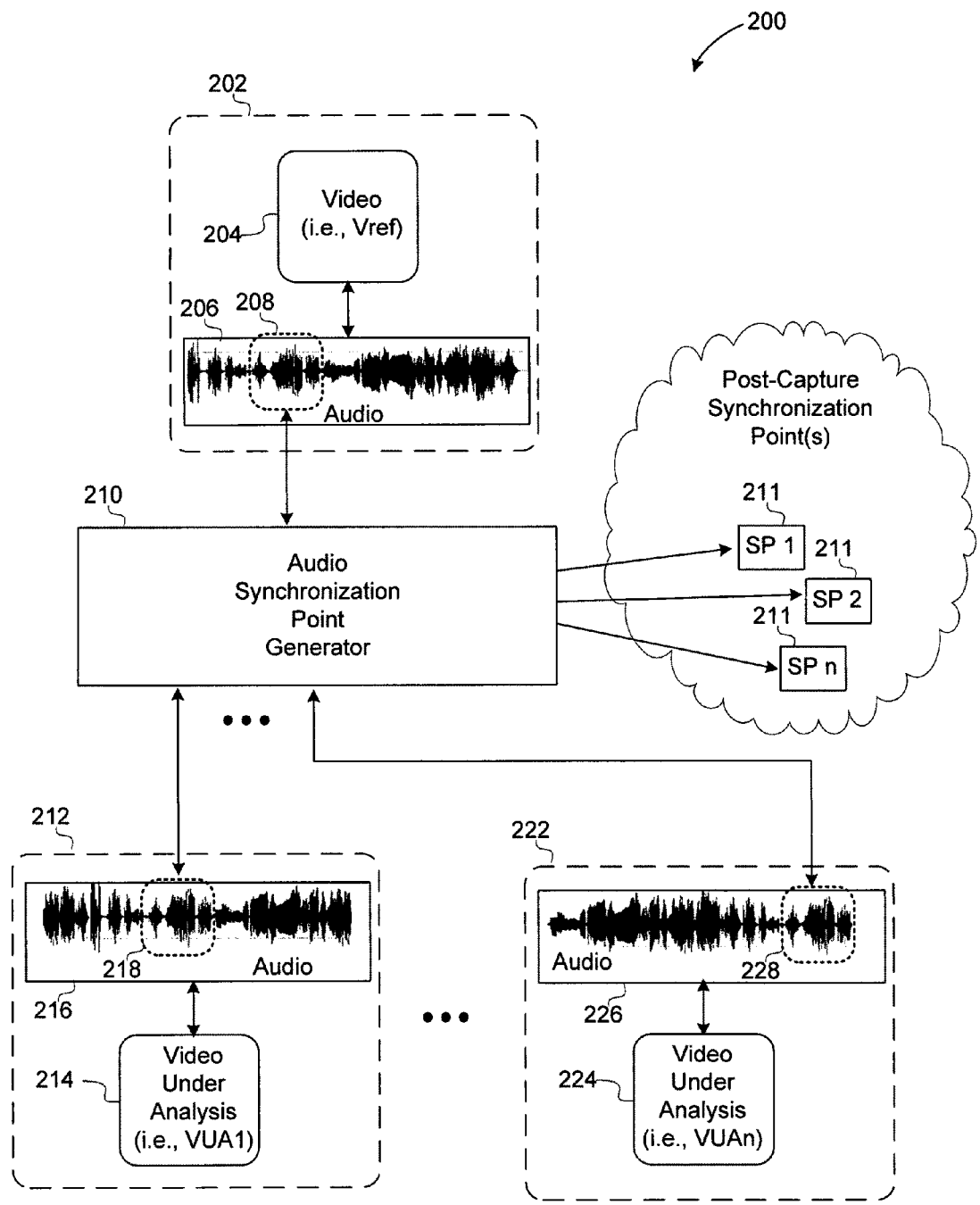
FIG. 2A is a diagram of an audio synchronization point generator that is configured to generate points at which to synchronize video and/or audio that are captured at multiple capture devices, according to at least one embodiment of the invention.

FIG. 2A is a diagram 200 of an audio synchronization point generator that is configured to generate points at which to synchronize video and/or audio that are captured at multiple capture devices, according to at least one embodiment of the invention. Audio synchronization point generator 210 can be configured to analyze different portions of content, such as content portions 202, 212, and 222, for synchronizing audio portions, such as audio portions 206, 216, and 226, with portions of video, such as video portions 204, 214, and 224. Different content portions can be captured by different cameras in a multiple-camera arrangement. Audio synchronization point generator 210 can be further configured to generate synchronization points 211 (e.g., SP1, SP2, . . . , SPn) that identify at least one portion of audio at which content portions 202, 212, and 222 are in (or are substantially in) synchronicity. Thus, synchronization points 211 facilitate the synchronization of audio portions 206, 216, and 226, which, in turn, facilitate the synchronization of video portions 204, 214, and 224. In one embodiment, audio synchronization point generator 210 can be configured to analyze an attribute of sound associated with, for example, a subset 208 of audio portion 206, and to determine whether the attribute of sound for subsets 218 and 228 are equivalent (or substantially equivalent). Equivalent attributes for audio subsets 208, 218, and 228, therefore, can represent a synchronization point for at least audio portions 206, 216, and 226. In at least one embodiment, audio synchronization point generator 210 can be configured to select a portion of video 204 as a reference video ("Vref"), and to analyze audio subset 208 against audio subsets 218 and 228 to synchronize with video portions 214 and 224, respectively, both of which represent specimen video under analysis ("VUA"). Thus, audio synchronization point generator 210 can provide for the generation of post-capture synchronization points for the purposes of synchronizing at least two portions of audio and/or video that can be captured at, for example, multiple capture devices (e.g., multiple cameras).

In view of the foregoing, audio synchronization point generator 210 can implement post-capture synchronization points to automatically identify synchronization points for at least two portions of audio, according to at least one embodiment of the invention. This can reduce the manual identification of equivalent portions of audio and/or video for synchronization purposes. Further, audio synchronization point generator 210 can generate post-capture synchronization points as a function of subject audio, which can include sounds generated by the subject and/or scene for which audio and/or video was captured. Subject audio is sought to be captured as content rather than for production (e.g., editing) purposes. As such, the generation of post-capture synchronization points for audio to synchronize video reduces the necessity to rely on external synchronization information to synchronize audio. Examples of external synchronization information include time codes and clapper sounds, as well as other synchronization signals and artificially-inserted sounds (i.e., non-subject sounds) that provide for synchronization points either prior to, or during, the capture of audio and video, or both. In addition, the implementation of audio synchronization point generator 210 can conserve resources and computational overhead by reducing the need to implement hardware to create the external synchronization information.

Figure 2B:
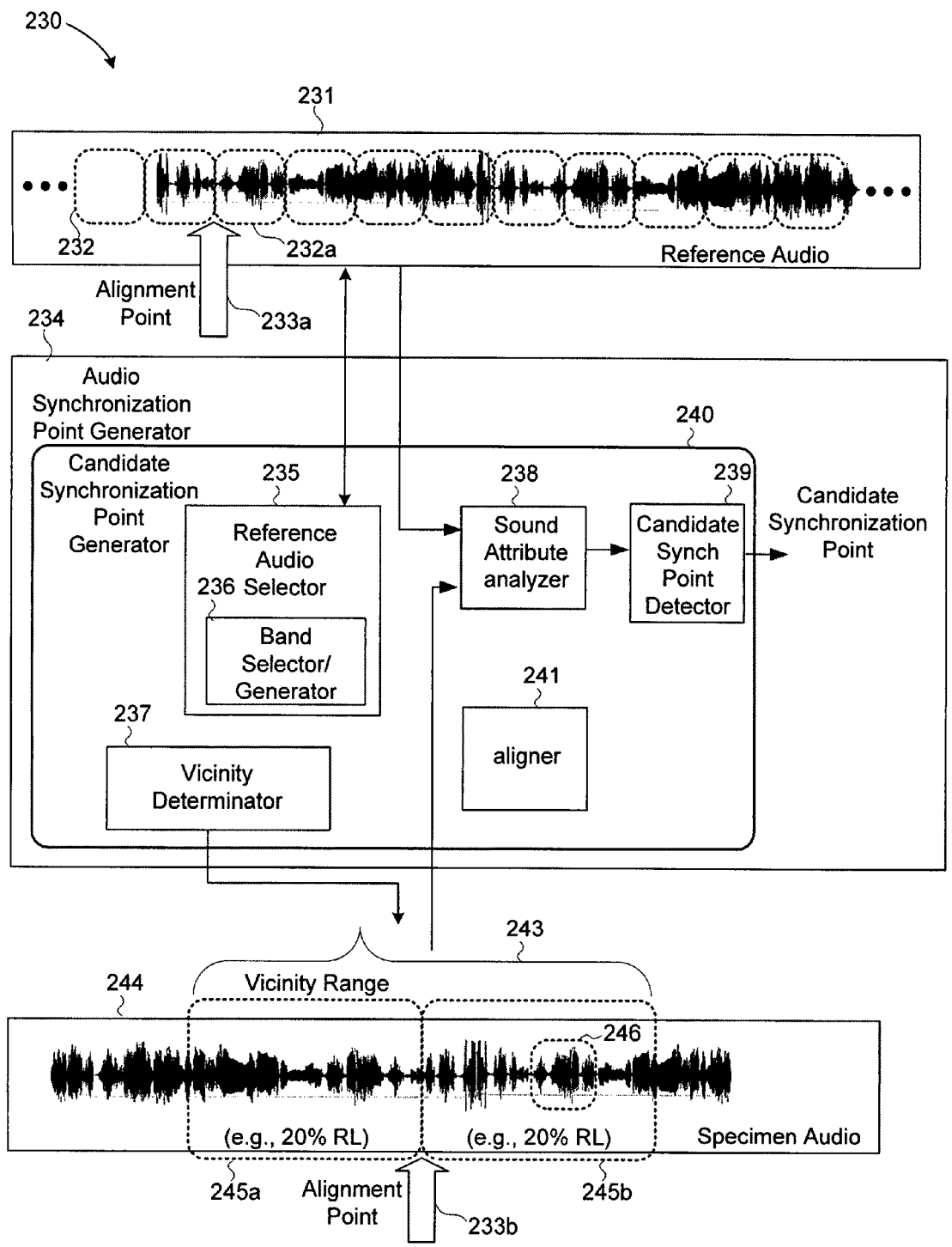
FIG. 2B is a diagram depicting an audio synchronization point generator that is configured to generate candidate synchronization points, according to at least one embodiment of the invention.

FIG. 2B is a diagram 230 depicting an audio synchronization point generator that is configured to generate candidate synchronization points, according to at least one embodiment of the invention. Audio synchronization point generator 234 can operate to identify a reference audio with which to compare to other specimen audio(s) to determine equivalent (or substantially equivalent) portions of audio that might qualify as post-capture synchronization points. In this example, audio synchronization point generator 234 includes a candidate synchronization point generator 240 that can be configured to generate at least one candidate synchronization point for a reference audio 231 and a specimen audio 244. In various embodiments, reference audio 231 and specimen audio 244 can either include subject audio or exclude external synchronization information, such as audible external synchronization information, or both. As shown, candidate synchronization point generator 240 can include a reference audio selector 235, a vicinity determinator 237, a sound attribute analyzer 238, a candidate synchronization ("synch") point detector 239, and aligner 241.

In operation, reference audio selector 235 can be configured to analyze content files to identify audio content within each content file for synchronization purposes. For example, reference audio selector 235 can be configured to extract audio portions from content files stored in a repository (not shown), while preserving associations to the corresponding video portions to synchronize both the audio and video. Reference audio selector 235 can also be configured to designate an audio portion from a content file as reference audio 231. In a specific embodiment, an audio portion can be designated as reference audio 231 as a function of an amount of data associated with the content file or its audio portion. Specifically, reference audio selector 235 can determine which content file has the largest amount of data for either the content or the audio, or both, and then designate the audio portion from that content file as reference audio 231. In at least one specific embodiment, reference audio 231 can have the longest duration relative to other audio portions from other content files. In one embodiment, reference audio selector 235 can also select one of the other audio portions as specimen audio 244.

FIG. 2B shows reference audio selector 235 including a band selector/generator 236 for generating and managing bands 232 of reference audio 231. In one embodiment, band selector/generator 236 can be configured to subdivide reference audio 231 into bands 232. As such, bands 232 can represent subsets of reference audio 231. Further, consider the following example in which reference audio 231 has a duration expressed in terms of time (i.e., a reference length, or "RL"), such as 30 minutes. In operation, band selector/generator 236 can generate any number of bands 232 having the same or different sizes. In one example, each band 232 can represent one percent (i.e., 1%) of the reference length. As such, each band 232 can represent 18 seconds (i.e., 1% of 30 minutes). Further, band selector/generator 236 can be configured to select a band for determining whether specimen audio 244 contains an equivalent (or substantially equivalent) attribute of sound, such as the attribute of sound for a subset 246 of specimen audio 244.

Vicinity determinator 237 can be configured to generate a vicinity range 243 within which band 232a is compared to specimen audio 244. Vicinity determinator 237 can be configured to size vicinity range 243 to any duration. For example, vicinity determinator 237 can size vicinity range 243 to 40% of RL (i.e., 12 minutes if RL is 30 minutes). Aligner 241 can be configured to align vicinity range 243 with an alignment point 233b that is coincident (or substantially coincident) with alignment point 233a for band 232a. In one embodiment, a time reference, such as a time code, can constitute alignment points 223a and 233b. While aligner 241 can be configured to position vicinity range 243 in any relation to alignment point 233b, aligner 241 has centered vicinity range 243 in this example such that a first half 245a and a second half 245b each includes 20% RL. In some embodiments, vicinity range 243 can extend up to 100% of reference audio 231.

Sound attribute analyzer 238 and candidate synchronization point detector 239 can be respectively configured to analyze an attribute of sound associated with reference audio 231, and determine whether the attribute of sound for subsets of specimen audio 244 is substantially equivalent. In at least one embodiment, sound attribute analyzer 238 can be configured to characterize a portion of reference audio 231, such as band 232a, in terms of at least one audio attribute to form a characterized portion (not shown) of reference audio 231. In one embodiment, sound attribute analyzer 238 can be configured to form the characterized portion of reference audio 231 to identify a pattern, and to search specimen audio 244 to find other matching patterns. Candidate synchronization point detector 239 can be configured to determine that specimen audio 244 includes the characterized portion of reference audio 231, and to generate at least a candidate synchronization point. In one embodiment, candidate synchronization point detector 239 can be configured to detect a matching pattern in specimen audio 244 to establish a candidate synchronization point. In at least one embodiment, band selector/generator 236 is configured to select another band 232 should candidate synchronization point detector 239 fail to detect a matching pattern, and is further configured to continue selecting other bands 232 until either at least one candidate synchronization point is detected or none is. In the latter case, audio synchronization point generator 234 can so indicate a state of no match to a user via, for example, a user interface (not shown). Then, reference audio selector 235 can select another specimen audio (not shown) for performing similar analysis.

In one embodiment, the attribute of sound can be the amplitude for an audio waveform that can expressed in percentages, decibels, and the like, relative to time. As such, sound attribute analyzer 238 can be configured to analyze the audio waveform amplitude in band 232a of reference audio 231 to identify a pattern of waveform amplitudes, as shown in band 232a of FIG. 2B. As such, sound attribute analyzer 238 can compare waveform amplitudes of band 232a with waveform amplitudes of specimen audio 244. To determine whether a candidate synchronization point exists, candidate synchronization point detector 239 determines whether the waveform amplitudes for band 232a match the waveform amplitudes for one or more subsets of specimen audio 244. In the example shown, candidate synchronization point detector 239 is configured to detect that the waveform amplitudes for band 232a are equivalent to the waveform amplitudes for subset 246. Subsequently, candidate synchronization point detector 239 can generate a candidate synchronization point for band 232a and subset 246. In at least one embodiment, the candidate synchronization point for band 232a and subset 246 can be located at or near band 232a and subset 246 so as to provide for the alignment of band 232a and subset 246 relative to each other. In a specific embodiment, a candidate synchronization point can be implemented as a post-capture synchronization point. In various embodiments, the attribute of sound can represent any characteristic of audio with which to compare and match portions of reference audio 231 and specimen audio 244. For example, the attribute of sound can also be the amplitude for an audio waveform relative to frequency. As such, sound attribute analyzer 238 can be configured to analyze the spectral frequencies and audio waveform amplitude in band 232a to identify a pattern for a frequency spectrum, which can be compared against subsets of specimen audio 244, including subset 246.

Candidate synchronization point detector 239 can be configured to provide a tolerance among values for the audio attribute to reduce false negatives (i.e., improper indications of mismatches between reference audio 231 and specimen audio 244) due to differences in tone, background noise, volume, and the like, that manifest in different audio portions that are captured by different cameras at different angles and spatial locations, according to at least one embodiment. In one embodiment, candidate synchronization point detector 239 can be configured to establish a deviation from a pattern for band 232a to form a deviated pattern (not shown) within which a subset of specimen audio 244 is deemed to match the pattern. As such, candidate synchronization point detector 239 can be configured to generate a candidate synchronization point if a portion of specimen audio 244, such as vicinity range 243, includes the deviated pattern, such as in subset 246. In one instance, if the amplitudes for the audio waveform for both band 232a and a particular subset of specimen audio 244 deviate less than an amount defined as a tolerance, such as by 5%, then band 232a and that particular subset of specimen audio 244 can be deemed as being equivalent (or substantially equivalent).

As used herein, the term "synchronization point" refers generally, at least in one embodiment, to a point at which portions of two or more audio waveforms, such as those captured by multiple capture devices at different angles and/or positions, are in synchronization. As an example, consider that matching shapes for portions of two or more audio waveforms relative to a point in time can constitute a synchronization point. As such, a synchronization point can indicate that a part of two or more audio waveforms are in synchronicity. In one embodiment, a synchronization point can represent matching portions of multiple audio waveforms. In another embodiment, a synchronization point can also refer to point in time relative to the matching portions. As used herein, the term "post-capture" refers generally, at least in one embodiment, to post-production activity that occurs after capturing video and audio, and includes the process of editing content. As used herein, the term "subject audio" refers generally, at least in one embodiment, to the audio generated by something, such as a person, an object or a scene, that is captured by multiple capture devices for purposes of producing either a video with audio, or an audio recording along, such as a movie or music. An example of a subject audio is the sounds produced by actors, such as their voices.

As used herein, the term "post-capture synchronization point" refers generally, at least in one embodiment, to a synchronization point that can be generated as part of post-production activity based on the subject audio. As such, the audio used to generate synchronization points includes sounds that are intended to remain within the final product, such as a movie or music, in accordance with at least one embodiment. In various embodiments, post-capture synchronization points may or may not result from certifying candidate synchronization points. As used herein, the term "candidate synchronization point" refers generally, at least in one embodiment, to a synchronization point that has yet to be certified, and thus is not confirmed as being a post-capture synchronization point with sufficient certainty. As used herein, the term "confirmatory candidate synchronization points" refers generally, at least in one embodiment, to additional candidate synchronization points that are examined to certify the candidate synchronization point.

As used herein, the term "audio" refers generally, at least in one embodiment, to one or more sounds that are audible (e.g., perceived by humans), and can be of or relate to the transmission, storage, reproduction or reception of sound. For example, audio can be in the form of an audio waveform, an audio file, an audio signal, an audio clip, an audio track, and the like. As used herein, the term "video" refers generally, at least in one embodiment, to one or more images that are visible (e.g., perceived by humans), and can be of or relate to the transmission, storage, reproduction or reception of images. For example, video can be in the form of a video waveform, a video file, a video signal, a video clip, a video track, and the like. As used herein, the term "external synchronization information" refers generally, at least in one embodiment, to one or more indicia (e.g., time codes, clapper sounds, and the like), as well as other synchronization signals and artificially-inserted sounds (i.e., non-subject sounds) that provide for synchronization points either prior to, or during, the capture of audio and video, or both. As used herein, the terms "audio attribute" and "attribute of sound" refer generally, at least in one embodiment, to a characteristic, property, quality or state that an audio (or a portion thereof) has that can be quantified to determine whether two or more portions of audio are either equivalent or are not equivalent. Examples of audio attributes include the shapes (or patterns) of audio waveforms (e.g., in terms of amplitude and time), as well as the shapes of frequency spectra (e.g., in terms of amplitude and frequency). As used herein, the term "content" refers generally, at least in one embodiment, to information and/or material presented within a display, an interface, or the like, in relation to, for example, an audio and/or visual presentation of sounds and/or imagery. Examples of content include text, such as an electronic document (e.g., a document in Portable Document Format ("PDF")), as well as audio, images, audio/video media, such as Flash® presentations, text, and the like. As used herein, the term "panel," at least in one embodiment, can refer to displays, palettes, tabs, windows, screens, portions of an interface, and the like. As such, a content file (or media file) can include a digital data file which is composed of images, sound and words for one camera angle.

Figure 2C:
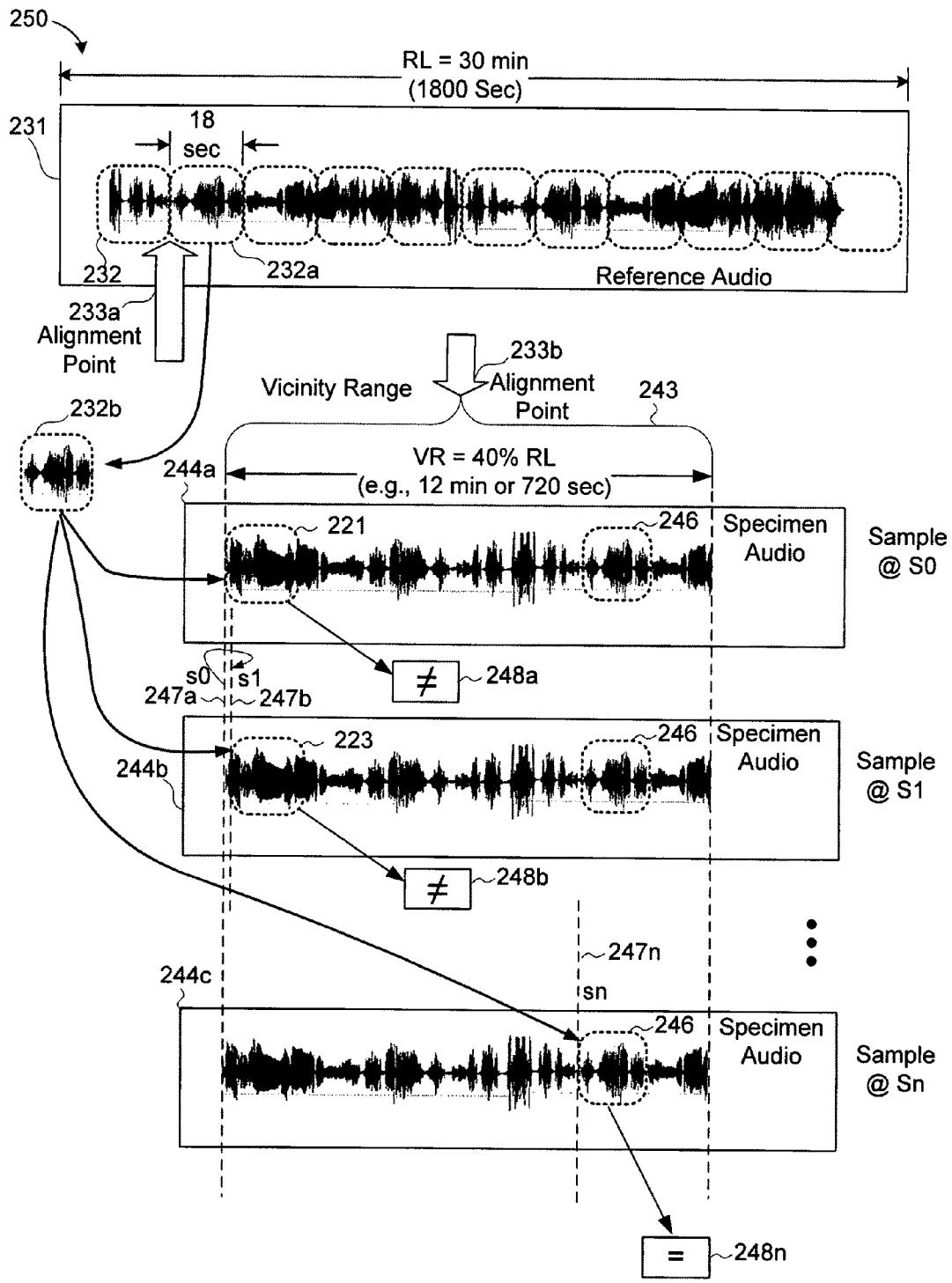
FIG. 2C is a diagram depicting an example of the operation of a sound attribute analyzer and a candidate synchronization point detector to determine one or more candidate synchronization points, according to at least one specific embodiment of the invention.

FIG. 2C is a diagram 250 depicting an example of the operation of a sound attribute analyzer and a candidate synchronization point detector to determine one or more candidate synchronization points, according to at least one specific embodiment of the invention. Similar to the example of FIG. 2B, a reference audio 231 is subdivided into bands 232. Here, the reference length, or "RL", is 30 minutes (or 1,800 seconds). The size of each band 232 is set at 1% of the reference length, or 18 seconds. Specimen audios 244a, 244b, and 244c each represent the same portion of specimen audio, but each has a different subset, such as different subsets 221, 223, and 246, against which band 232a is being compared. Alignment points 233a and 233b align band 223a with vicinity range 243, which, in this case, has a duration equal to 40% of the reference length, or 12 minutes.

Sound attribute analyzer 238 (FIG. 2B) is configured to compare band 232b, which is band 232a, to various subsets, such as subsets 221, 223, and 246. In one embodiment, sound attribute analyzer 238 compares the first audio sample of band 232b—and subsequent samples therein—to the first audio sample 247a of specimen audio portion 244a, which is the $0^{th}$ sample (i.e., the sample at S0), and subsequent samples within subset 221. In some embodiments, reference audio 231 and specimen audio portions 244a, 244b, and 244c include 48,000 audio samples per second. As such, 18 seconds of audio in band 232, as well as subsets 221, 223, and 246, include 1,600 samples. So, sound attribute analyzer 238 can compare 864,000 samples (or fewer, in some cases) between band 232b and a subset of a specimen audio.

Continuing with the above example, candidate synchronization point detector 239 can determine whether each of the audio samples match (e.g., within an amount of tolerance). If so, then candidate synchronization point detector 239 generates a candidate synchronization point. If not, then candidate synchronization point detector 239 generates an indication 248a that subset 221 is not equal to band 232b. Moving along to the next analysis, sound attribute analyzer 238 compares the first audio sample of band 232b—and subsequent samples therein—to the second audio sample 247b of specimen audio 244b, which is the $1^{st}$ sample (i.e., the sample at S1), and subsequent samples within subset 223. Here, subset 223 does not match with band 232b and, thus, candidate synchronization point detector 239 generates an indication 248b to indicate the mismatch. Sound attribute analyzer 238 and candidate synchronization point detector 239 continue to cooperate as described above until the $n^{th}$ audio sample 247n of specimen audio 244c is reached. Here, the $n^{th}$ sample (i.e., the sample at Sn)—and subsequent samples within subset 246—are matched to corresponding audio samples in band 232b. Upon determining a match, candidate synchronization point detector 239 generates an indication 248n that the subset 246 is equal (or is substantially equal) to band 232b, and generates a candidate synchronization point. In various embodiments, sound attribute analyzer 238 can compare bands and subsets, in any order or quantity. In some embodiments, sound attribute analyzer 238 can compare fewer than the quantity of samples in bands 232 (or any number of samples) by skipping audio sample comparisons to, for example, reduce the number of comparisons.

Figure 2D:
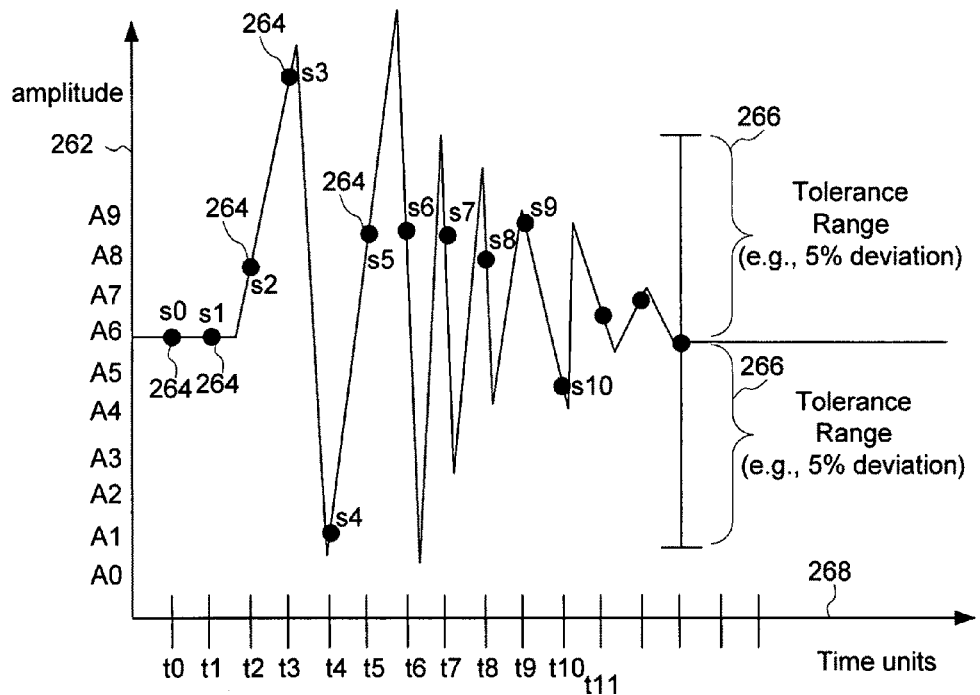
FIGS. 2D and 2E are diagrams depicting different attributes of sound that can be used to determine candidate synchronization points, according to various embodiments of the invention.
Figure 2E:
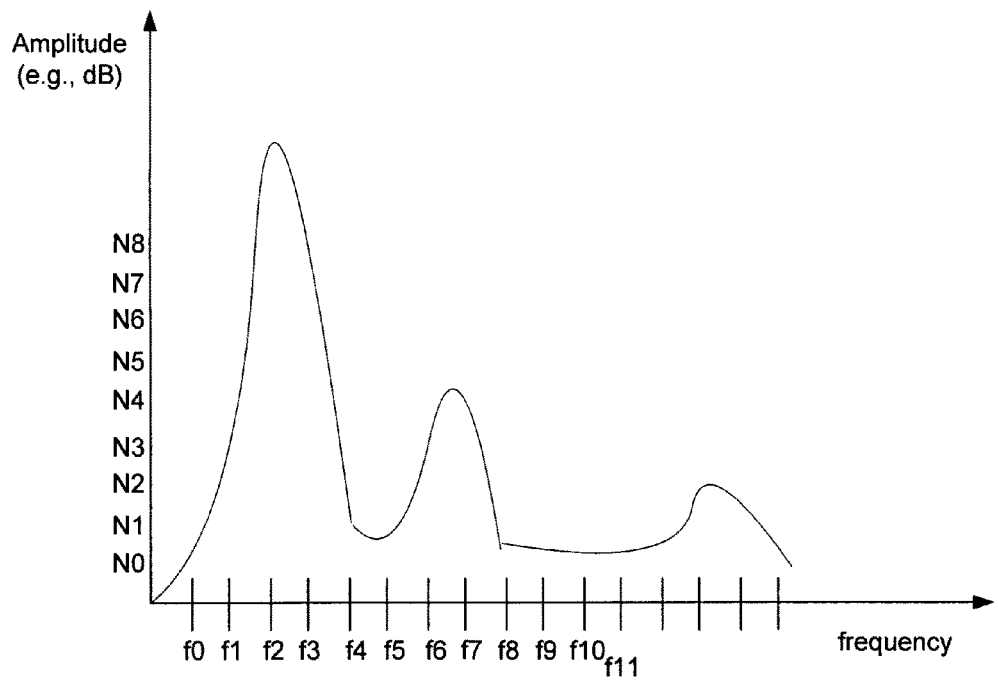

FIGS. 2D and 2E are diagrams depicting different attributes of sound that can be used to determine candidate synchronization points, according to various embodiments of the invention. FIG. 2D illustrates a part of an audio waveform for a reference audio that is compared to an audio waveform of a specimen audio (not shown). Each audio sample 264, such as samples S1, S2, etc., have a unique amplitude at a specific unit of time 268. Sound attribute analyzer 238 (FIG. 2B) can be configured to compare the amplitude (e.g., "A6") of sample S0 (i.e., the first sample in a band) to the amplitude of the first sample in a specimen audio subset (not shown). If the amplitude of the first sample in the specimen audio subset is within the tolerance ranges 266, then candidate synchronization point detector 239 (FIG. 2B) can operate to indicate a match for the samples. Subsequent samples, such as samples S2, S3, etc., are similarly analyzed until no additional samples in the band requires matching. FIG. 2E illustrates an example of a frequency spectrum—as a matchable pattern—for the audio waveform in a band of reference audio. In one embodiment, sound attribute analyzer 238 (FIG. 2B) can be configured to analyze the frequency spectrum (or a portion thereof) for a subset of specimen audio to generate a pattern (not shown) of frequency relative to amplitude. Sound attribute analyzer 238 then can compare the frequency spectra (or a portions thereof) for the band and the subset of specimen audio to determine whether a candidate synchronization point exists.

Figure 3A:
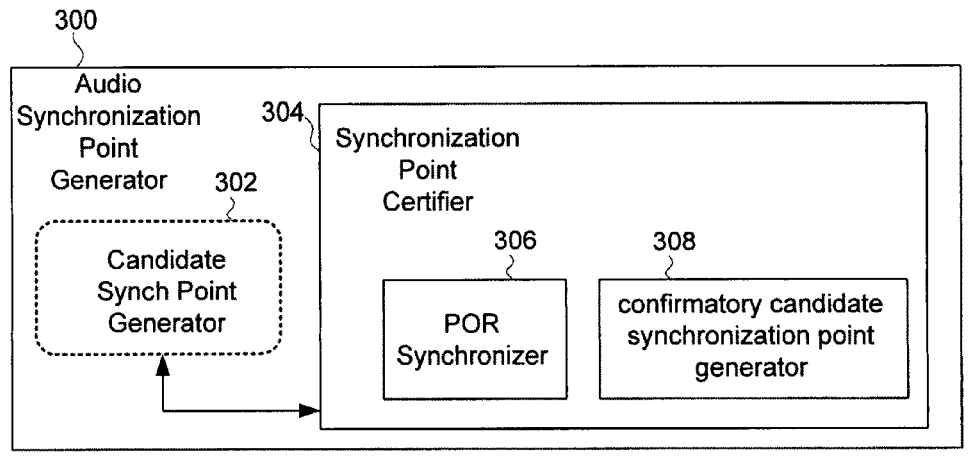
FIG. 3A illustrates another example of an audio synchronization point generator that includes a synchronization point certifier, according to at least one embodiment of the invention.

FIG. 3A illustrates another example of an audio synchronization point generator that includes a synchronization point certifier, according to at least one embodiment of the invention. In this example, audio synchronization point generator 300 includes a candidate synchronization ("synch") point generator 302, which can have equivalent structure and/or functionality as candidate synchronization point generator 240 (FIG. 2B), and a synchronization point certifier 304, which can be configured to certify that a candidate synchronization point is useable as a post-capture synchronization point to synchronize at least two portions of video. In particular, synchronization point certifier 304 can be configured to identify additional candidate synchronization points for additional subsets of a specimen audio and bands. As shown, synchronization point certifier 304 includes a point of reference ("POR") synchronizer 306 and a confirmatory candidate synchronization point generator 308. Point of reference synchronizer 306 is configured to generate a point of reference with which to match the additional bands to additional subsets of the specimen audio. In one embodiment, the candidate synchronization point is the point of reference, and, thereby, provides a tentative synchronization point from which to locate confirmatory candidate synchronization points. Confirmatory candidate synchronization point generator 308 is configured to generate one or more confirmatory candidate synchronization points to certify that a candidate synchronization point generated by candidate synchronization point generator 240 can be implemented as a post-capture synchronization point.

Figure 3B:
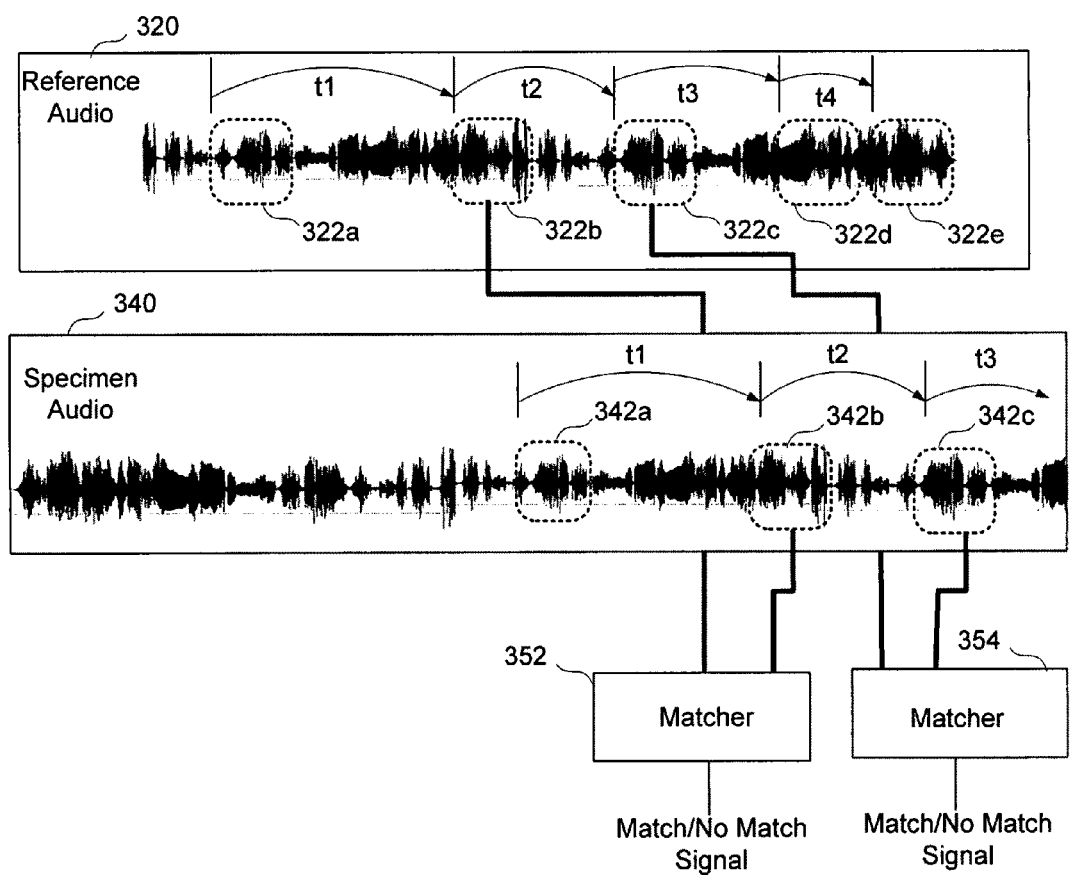
FIG. 3B illustrates the functionality of a synchronization point certifier, according to at least one embodiment of the invention.

FIG. 3B illustrates the functionality of a synchronization point certifier, according to at least one embodiment of the invention. In response to candidate synchronization point generator 240 generating a candidate synchronization point, confirmatory candidate synchronization point generator 308 selects additional bands in a reference audio 320 to determine whether the audio in these bands are equivalent to corresponding subsets of specimen audio 340. In this example, confirmatory candidate synchronization point generator 308 selects additional bands 322b, 322c, 322d, and 322e to match with corresponding subsets 342b, and 342c (note that subsets corresponding to bands 322d and 322e are not shown). Note that band 322a and subset 342 coincide with a candidate synchronization point, and, thus, provide a point of reference to locate other bands and subsets at distances, t1, t2, t3, etc.

Point of reference synchronizer 306 is configured to select corresponding subsets of specimen audio 340 that are separated by similar amounts of time units from each other. For example, point of reference synchronizer 306 can designate additional band 322a as a point of reference from which to index other additional bands 322b to 322e. As such, additional bands 322a and 322b are separated by "t1" time units, additional bands 322b and 322c are separated by "t2" time units, and so on. Similarly, point of reference synchronizer 306 can designate subset 342a as a point of reference from which to index other subsets 342b to 342c. As such, additional subsets 342a and 342b are separated by "t1" time units, additional subsets 342b and 342c are separated by "t2" time units, and so on. In one embodiment, synchronization point certifier 304 subdivides reference audio 320 into regions, such as 5 regions, and randomly selects a band in each region. Each randomly-selected band can be indexed in time with respect to a point of reference for reference audio 320, such as the first randomly-selected band. Further, synchronization point certifier 304 can identify subsets in specimen audio 340 that correspond to the randomly-selected bands.

In one embodiment, synchronization point certifier 304 includes matchers to match additional bands 322b and 322c to corresponding subsets 342b and 342c (note that matchers for additional bands 322d and 322e are omitted). For example, matcher 352 is configured to determine whether additional band 322b matches corresponding subset 342b. Matcher 354 performs similar matching operations. Synchronization point certifier 304 can be configured to provide a threshold for a number of positive matches by matchers 352 and 354 (as well as others not shown) to certify that the candidate synchronization point is a post-capture synchronization point. In a specific embodiment, synchronization point certifier 304 implements 5 matchers similar to matchers 352 and 354, and provides a threshold of 3 positive matches. As such, synchronization point certifier 304 can operate to certify that a candidate synchronization point is a post-capture synchronization point if 3 or more matchers determine matches between additional bands and subsets of specimen audio 340. But if synchronization point certifier 304 detects 2 or fewer matches, then the candidate synchronization point is discarded as rejected in favor of, for example, determining another candidate synchronization point.

Figure 4:
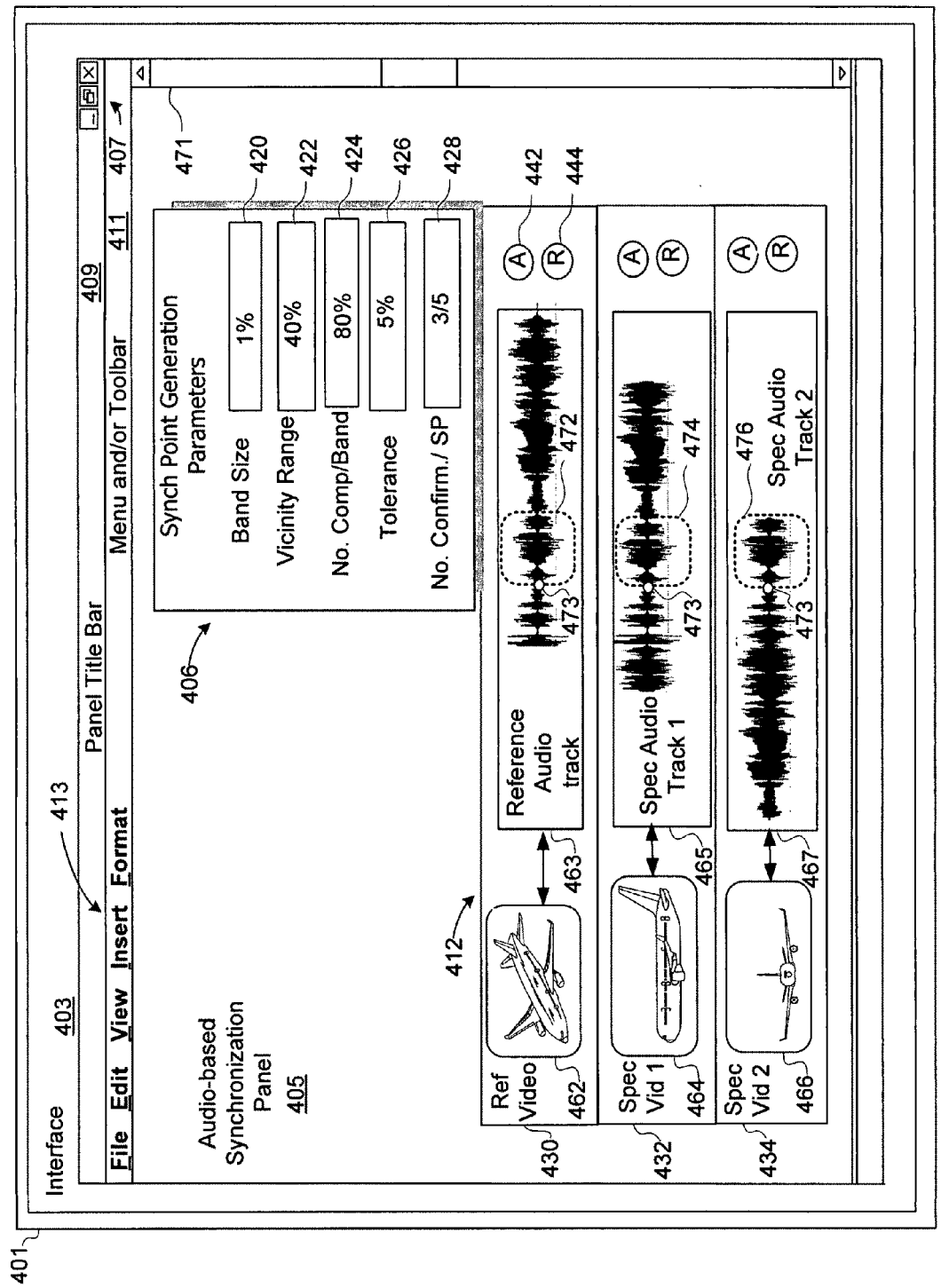
FIG. 4 is a diagram depicting the presentation of an audio-based synchronization panel, according to at least one embodiment of the invention.

FIG. 4 is a diagram depicting the presentation of an audio-based synchronization panel, according to at least one embodiment of the invention. In this example, a display 401 is configured to provide an interface 403, which, in turn, is configured to present an audio-based synchronization panel 405. Audio-based synchronization panel 405 can be configured to include multi-camera panel portion 412 for at least presenting videos and audio tracks (e.g., in the form of audio waveform representations), as captured by multiple cameras. Audio-based synchronization panel 405 can also be configured to present an interactive panel portion 406 configured to accept synchronization point generation parameters for governing the operation of an audio synchronization point generator. Audio-based synchronization panel 405 includes a panel title bar 409, which can indicate the file name for content file that includes multi-camera audio and video, a menu and/or toolbar 411, which is shown to include at least menu items 413, panel control buttons 407, and scroll bar 471. In at least one embodiment, audio-based synchronization panel 405 facilitates editing video associated with reference audio track and one or more specimen audio tracks to form a video. In various instances, synchronization points can be implemented as audible sound as either the reference audio or the specimen audio, or both, in association with the video.

In this example, multi-camera panel portion 412 includes content captured at different capture devices each of which is at a different angle and/or position, such as content 430, 432 and 434. Here, content 430, 432 and 434 include a reference video ("Ref Video") 462, a first specimen video ("Spec Vid 1") 464, and a second specimen video ("Spec Vid 2") 466, respectively, which, in turn, are associated with a reference audio track 463, a first specimen audio track ("Spec Audio Track 1") 465, and a second specimen audio track ("Spec Audio Track 2") 467. Audio-based synchronization panel 405 is configured to present a reference audio track 463, a first specimen audio track ("Spec Audio Track 1") 465, and a second specimen audio track ("Spec Audio Track 2") 467, each of which is synchronized at or near a post-capture synchronization point 473, according to one embodiments. Presentation of post-capture synchronization point 473 can be optional. An editor then can observe the videos 462, 464, and 466, and audio tracks 463, 465, and 467 to determine whether they have been properly synchronized using an audio synchronization point generator (not shown). For example, the editor can observe (e.g., view and/or listen to) the audible sounds among band 472, subset 474, and subset 476 to determine whether they are sufficiently synchronized. If so, the editor can accept a post-capture synchronization point 473 by, for example, selecting an accept button ("A") 442 to generate an accept command. Otherwise, the selection of rejection button ("R") 444 causes the generation of a reject command to, for example, initialize the audio synchronization point generator to again try to find the proper post-capture synchronization point.

Interactive panel portion 406 can be configured to accept input from the editor to modify the operation of the audio synchronization point generator to reexamine the candidate synchronization point. For example, interactive panel portion 406 can include band size input field 420 to modify the size of one or more bands; a vicinity range input field 422 to modify the size of a vicinity range in which perform comparisons; a number of comparisons per band input field ("No. Comp/Band") 424 to change the number of audio samples per band (e.g., 80% of audio samples in a band) that are used to compare against specimen audio subsets; a tolerance range input field 426 to modify the number of deviant waveform values that can result in a match; and a number of confirmatory candidate synchronization points per certification of a post-capture synchronization point ("No. Confirm./SP") 428, such as changing a threshold from 3 matches out of 5 confirmatory candidate synchronization points to, for example, 4 out of 5 to certify.

Figure 5:
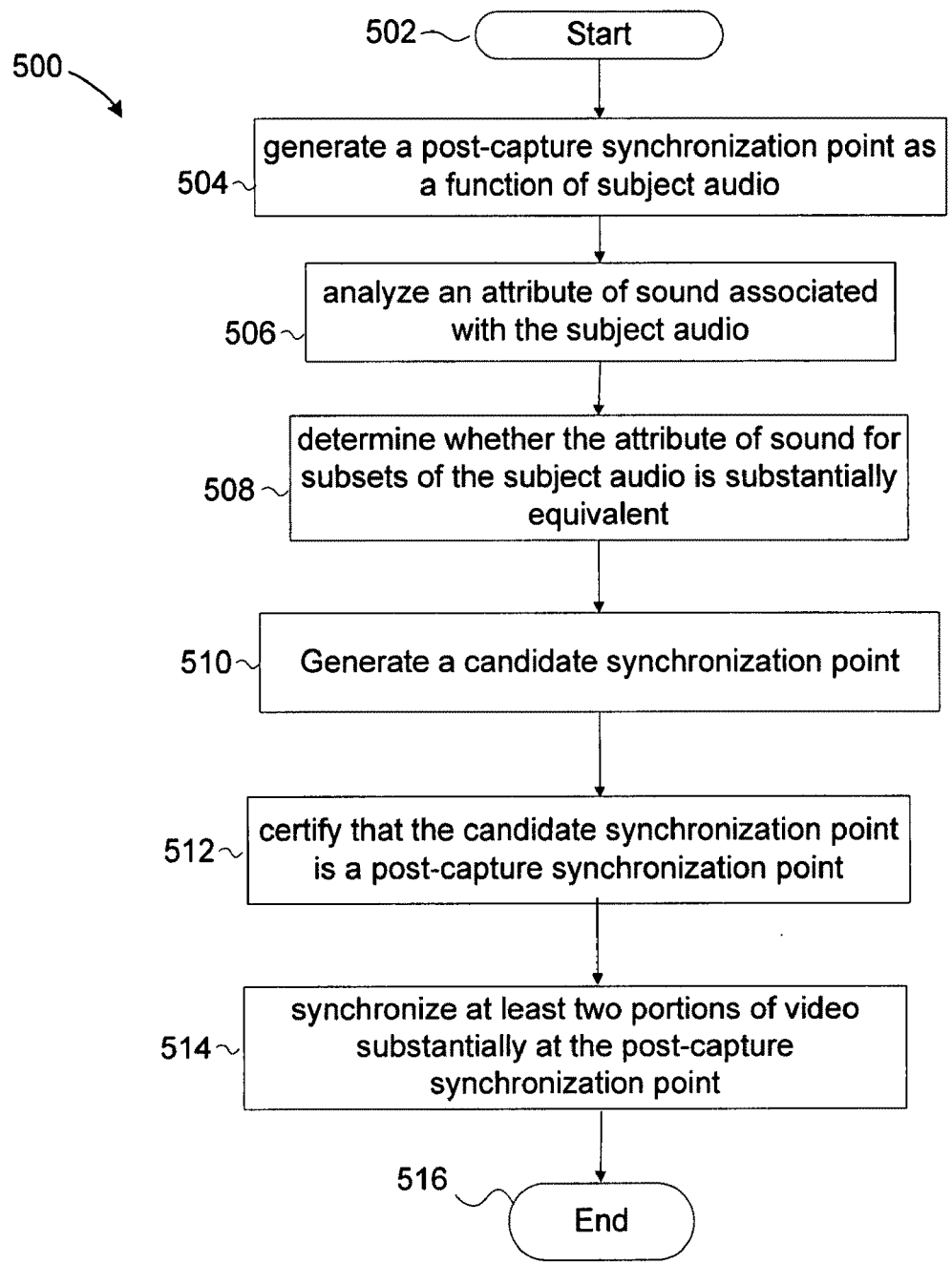
FIG. 5 is a flow diagram depicting one example of a method for synchronizing video and/or audio based on the generation of post-capture synchronization points, according to one embodiment of the invention.

FIG. 5 is a flow diagram depicting one example of a method for synchronizing video and/or audio based on the generation of post-capture synchronization points, according to one embodiment of the invention. As shown, flow 500 begins at 502, with an interface, a processor, an application and/or logic, generating a post-capture synchronization point at 504 as a function of a subject audio. Flow 500 analyzes an attribute of sound associated with the subject audio at 506, and, at 508, there is a determination whether the attribute of sound for subsets of the subject audio are substantially equivalent. If so, flow 500 generates a candidate synchronization point at 510. In at least one embodiment, flow 500 certifies that the candidate synchronization point is a post-capture synchronization point at 512. At 514, at least two portions of video can be synchronized at (or substantially at) the post-capture synchronization point. Flow 500 terminates at 516.

Figure 6:
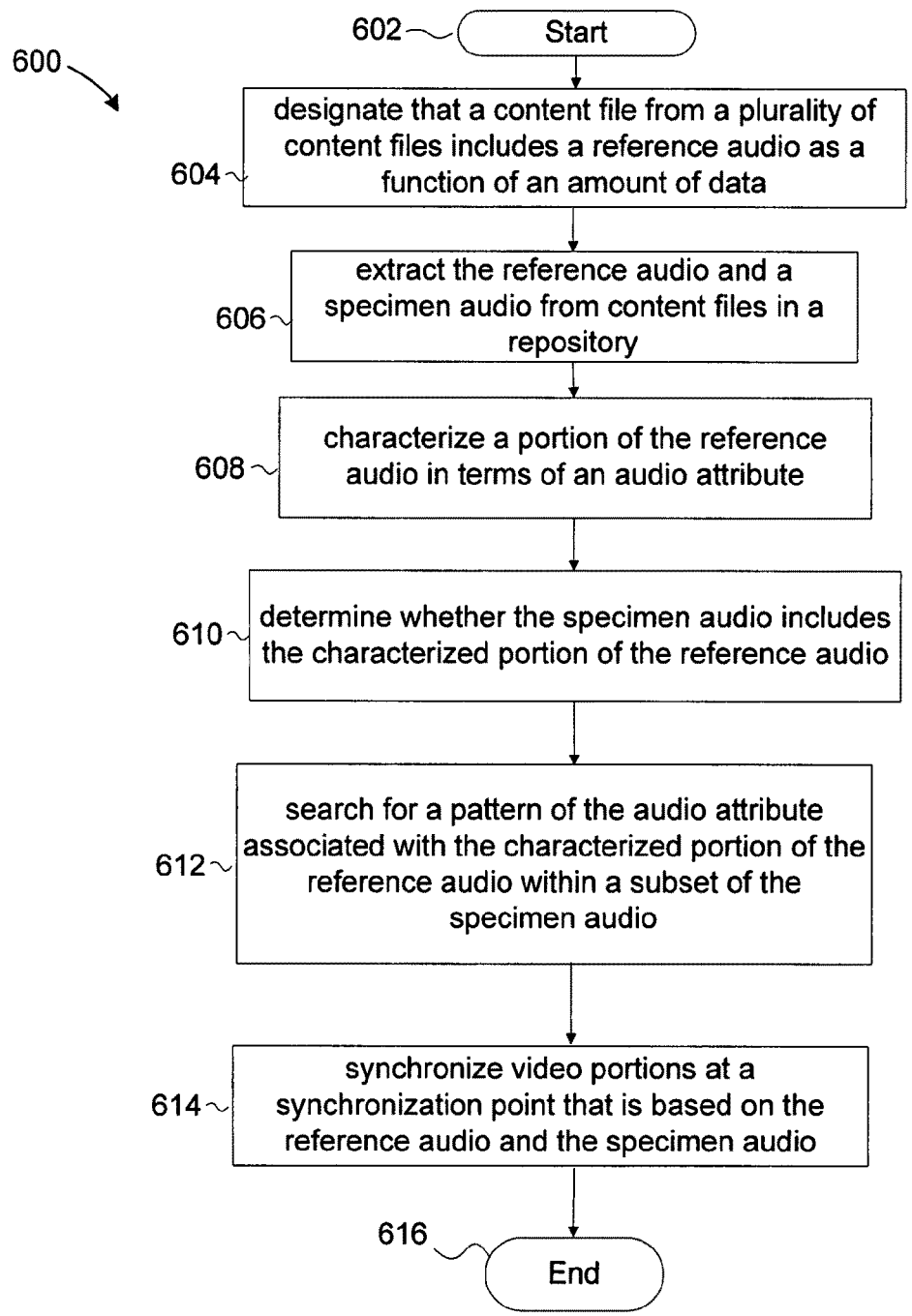
FIG. 6 is a flow diagram depicting another example of a method for synchronizing video and/or audio based on the generation of post-capture synchronization points, according to another embodiment of the invention.

FIG. 6 is a flow diagram depicting another example of a method for synchronizing video and/or audio based on the generation of post-capture synchronization points, according to another embodiment of the invention. As shown, flow 600 begins at 602, with an interface, a processor, an application and/or logic, designating that a content file from a plurality of content files includes a reference audio as a function of an amount of data at 604. At 606, the reference audio and a specimen audio can be extracted from content files in a repository. A portion of the reference audio is characterized in terms of an audio attribute at 608. At 610, an entity, such as an interface, a processor, an application, a circuit, and/or logic, implementing flow 600 determines whether the specimen audio includes the characterized portion of the reference audio. For example, flow 600 can search for a pattern of the audio attribute associated with the characterized portion of the reference audio within a subset of the specimen audio at 612 to determine a match. At 614, flow 600 synchronizes video and/or audio portions at a synchronization point that is based on the reference audio and the specimen audio. Flow 600 terminates at 616.

Figure 7A:
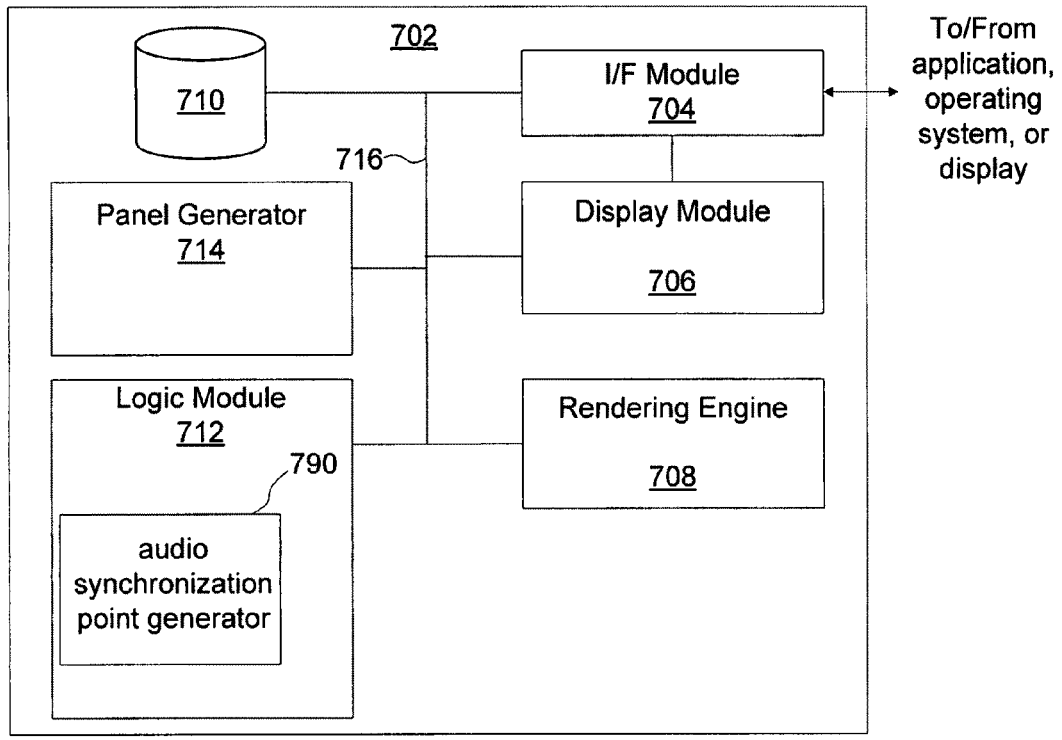
FIG. 7A illustrates an example of a panel presentation application for implementing a multi-camera panel that presents audio tracks synchronized with the use of post-capture synchronization points, according to various embodiments of the invention.

FIG. 7A illustrates an example of a panel presentation application for implementing a multi-camera panel that presents audio tracks synchronized with the use of post-capture synchronization points, according to various embodiments of the invention. In at least one embodiment, an audio-based synchronization panel, an interactive panel for modifying operation of an audio synchronization point generator, and a multi-camera panel can be implemented in a panel, such as a single panel, in one or more portions thereof, or in separate panels. Here, application 702 includes interface ("I/F") module 704, display module 706, rendering engine 708, repository 710, logic module 712, panel generator 714, and data bus 716. In some examples, the number and type of elements shown and described may be varied and are not limited to the descriptions provided. In some examples, the above-described elements can be implemented as part, component, or module of application 702. As an example, application 702 can be implemented to include either commands for accepting or rejection audio track synchronization by a post-capture synchronization, or for modifying operation of an audio synchronization point generator, or both, the commands imparting functionalities as described herein. Logic module 712 can be implemented as software, hardware, circuitry, or a combination thereof to implement control logic for the described techniques for panel presentation.

Figure 9:
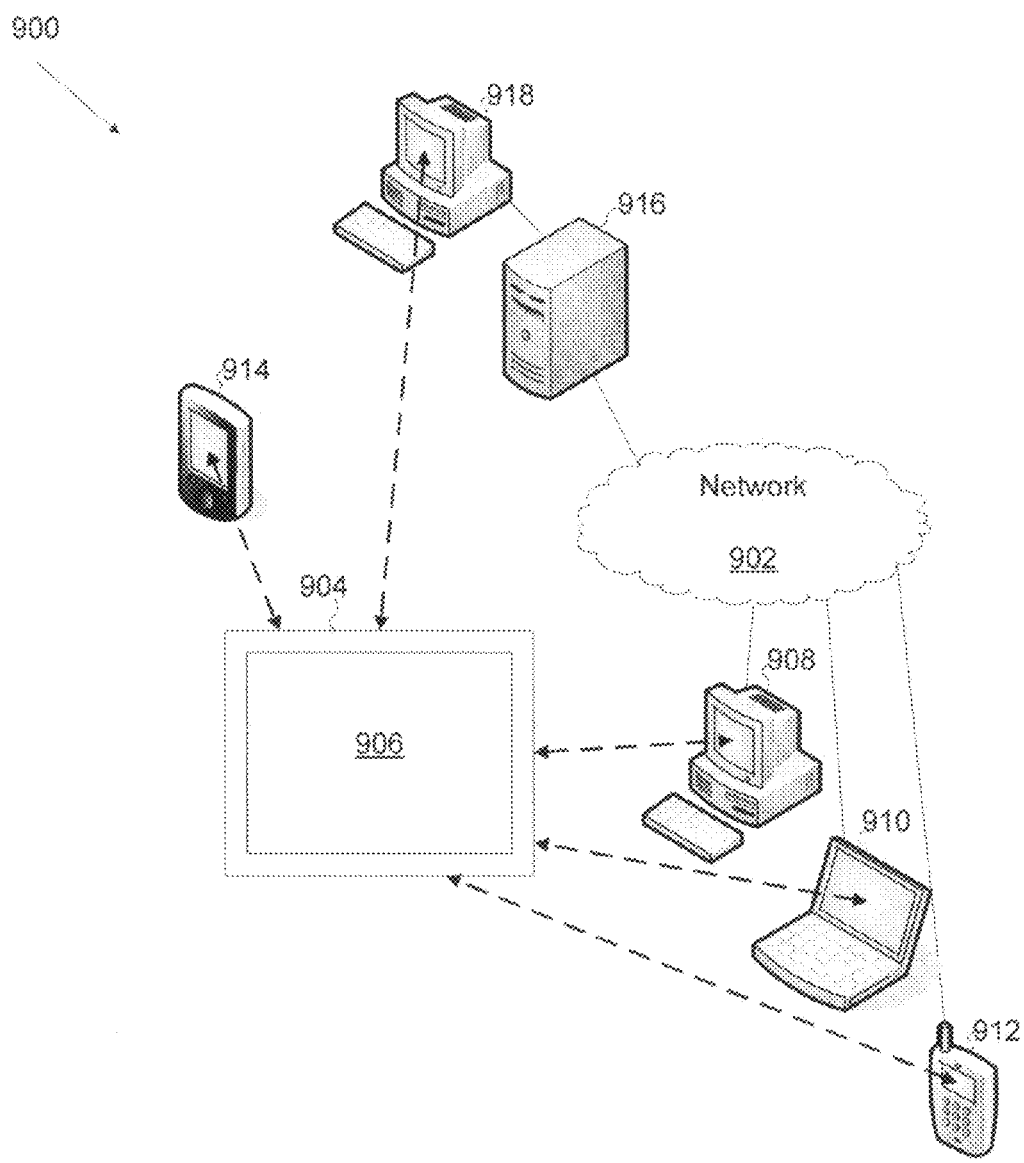
FIG. 9 illustrates an example of a panel presentation system for editing video clips associated with post-capture synchronization points for a reference audio and a specimen audio, according to various embodiment of the invention.

In some examples, logic module 712 can be configured to control panel generator 714 to form a multi-camera panels that are configured to present audio tracks that are automatically synchronized based on subject audio. Rendering engine 708 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 704 can exchange panel presentation data, including content data, image data, audio data, as well as other data, between application 702 and another application (e.g., a host, client, web services-based, distributed (i.e., enterprise), application programming interface ("API"), operating system, program, procedure or others) that can use data and information generated from panel generator 714 to render presented panels on a display screen. In other examples, the above-described techniques and elements can be varied in design, implementation, and function and are not limited to the descriptions provided. In one embodiment, logic module 712 can include an audio synchronization point generator 790 that is configured to include structure and/or functionality similar to one or more previously-described audio synchronization point generators.

Figure 7B:
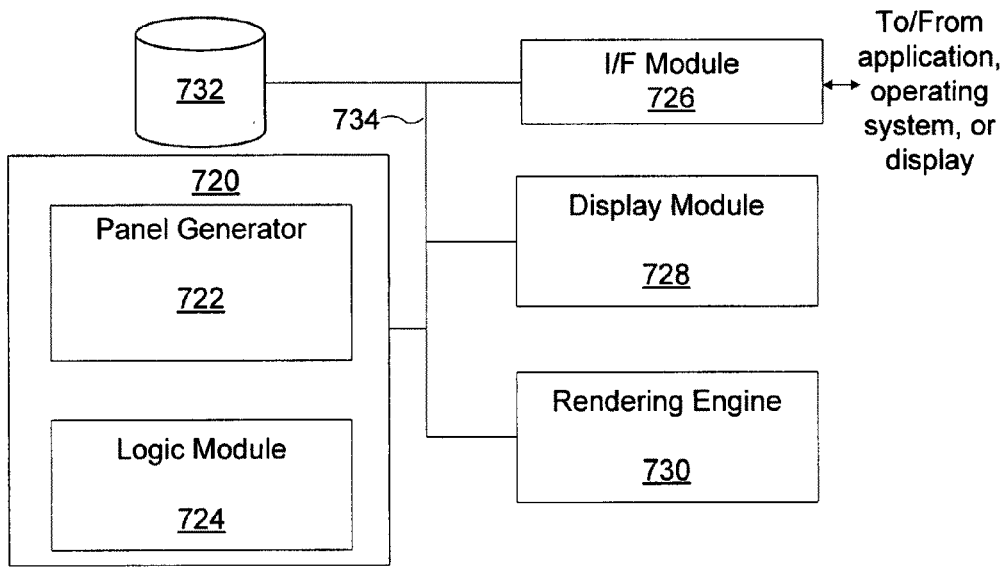
FIG. 7B illustrates an alternative example of a panel presentation application for implementing a multi-camera panel that presents audio tracks synchronized with the use of post-capture synchronization points, according to at least one embodiment of the invention.

FIG. 7B illustrates an alternative example of a panel presentation application for implementing a multi-camera panel that presents audio tracks synchronized with the use of post-capture synchronization points, according to one embodiment of the invention. Here, application 720 includes panel generator 722 and logic module 724, which can have equivalent functionality as 712 of FIG. 7A. Further, application 720 is shown in data communication with interface ("I/F") module 726, display module 728, rendering engine 730, and repository 732. Data bus 734 can be configured to send or receive data among application 720, IN module 726, display module 728, rendering engine 730, and repository 732. In other examples, more, fewer or different elements can be used and implemented without limitation to the examples provided above.

In some examples, logic module 724 and panel generator 722 can be implemented as part of application 720, which can be implemented separately from other functional components or modules, such as interface module 726, display module 728, rendering module 730, and repository 732. Data bus 734 can be implemented to communicate data over a given port between application 720 and interface module 726, display module 728, rendering module 730, and repository 732. In some instances, application 720 can be implemented as a standalone application or as a component (i.e., module) of another application. Data or information (e.g., content file data including either video data or audio data, or both, data for modifying the operation of the audio synchronization point generator, data for describing candidate and post-capture synchronization points, data for describing one or more audio attributes, and the like) associated with a panel can be stored in repository 732, which can be implemented using a database, data store, data warehouse, or any other type of data repository or structure. In other examples, more, fewer, or different modules can be used to implement the described techniques for panel presentation and are not limited to those provided.

Figure 8:
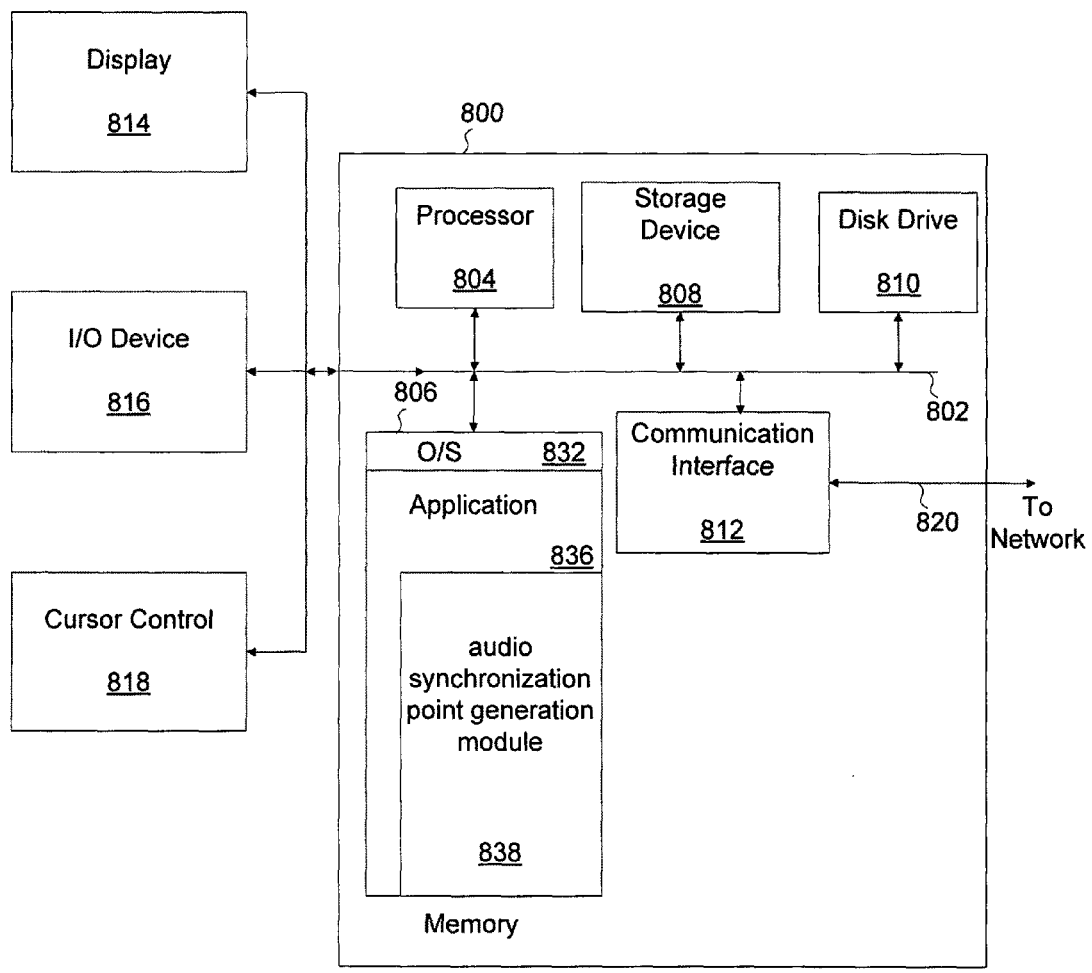
FIG. 8 illustrates an exemplary computer system suitable for implementing an interactive panel for an interface to modify the operation of an audio synchronization point generator, according to at least one embodiment of the invention.

FIG. 8 illustrates an exemplary computer system suitable for implementing an interactive panel for an interface to modify the operation of an audio synchronization point generator, according to at least one embodiment of the invention. In some examples, computer system 800 can be used to implement computer programs, applications, methods, processes, or other software to perform the above-described techniques and to realize the structures described herein. Computer system 800 includes a bus 802 or other communication mechanism for communicating information, which interconnects subsystems and devices, such as processor 804, system memory ("memory") 806, storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and pointer cursor control 818 (e.g., mouse or trackball). In one embodiment, pointer cursor control 818 invokes one or more specialized commands that, at least in part, accepts or rejects a post-capture synchronization point. Pointer cursor control 818 can interact via a pointer cursor with a multi-camera panel to manually synchronize audio tracks by moving the one or more tracks relative to a post-capture synchronization point.

According to some examples, computer system 800 performs specific operations in which processor 804 executes one or more sequences of one or more instructions stored in system memory 806. Such instructions can be read into system memory 806 from another computer readable medium, such as static storage device 808 or disk drive 810. In some examples, hard-wired circuitry can be used in place of or in combination with software instructions for implementation. In the example shown, system memory 806 includes modules of executable instructions for implementing an operation system ("O/S") 832, an application 836, and an audio synchronization point generation module 838.

The term "computer readable medium" refers, at least in one embodiment, to any medium that participates in providing instructions to processor 804 for execution. Such a medium can take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 800. According to some examples, two or more computer systems 800 coupled by communication link 820 (e.g., LAN, PSTN, or wireless network) can perform the sequence of instructions in coordination with one another. Computer system 800 can transmit and receive messages, data, and instructions, including program code (i.e., application code) through communication link 820 and communication interface 812. Received program code can be executed by processor 804 as it is received, and/or stored in disk drive 810, or other non-volatile storage for later execution. In one embodiment, system 800 is implemented as a hand-held device, such as a mobile phone 850. But in other embodiments, system 800 can be implemented as a personal computer (i.e., a desk top computer) or any other computing device.

FIG. 9 illustrates an example of a panel presentation system for editing video clips associated with post-capture synchronization points for a reference audio and a specimen audio, according to various embodiment of the invention. Here, system 900 includes network 902, display environment 904, interface 906, which can be presented on devices such as computer 908, notebook computer ("notebook" or "laptop") 910, smart phone 912, personal digital assistant ("PDA") 914, server 916, and administrator computer 918. In other examples, the number and type of devices can be varied and are not limited to those shown and described.

In some examples, one or more panels for synchronizing video can be presented on interface 906, which can be an interface for an application, such as a video and audio editing application, or as a web browsing program, Internet content portal, client or desktop application for any purpose. Panels can be used to provide additional or supplemental information that can be contextually relevant to another panel presented in interface 906. Computer 908, notebook computer ("notebook" or "laptop") 910, smart phone 912, personal digital assistant ("PDA") 914, server 916, and administrator computer 918 can provide content data for rendering content as well as other data, which can be implemented to generate, for example, post-capture synchronization points and/or synchronized audio tracks in interface 906. In some cases, an operating system installed on computer 908 can communicate (i.e., via an application programming interface ("API")) content data and/or other related data to another application installed on computer 908 to render (i.e., interpreting data and information to draw or display the content in an interface) one or more panels presented in interface 906. In some examples, different types of panels can be rendered in interface 906. In one embodiment, interface 906 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 7A to 9, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A non-transitory computer readable medium storing executable instructions which, when executed by a computer, cause the computer to:
   generate a post-capture synchronization point as a function of a subject audio, the post-capture synchronization point specifying equivalent portions of the subject audio, wherein to generate the post-capture synchronization point the executable instructions generate a candidate synchronization point with which to establish the post-capture synchronization point, and to generate the candidate synchronization point the executable instructions:
      analyze an attribute of sound associated with multiple audio tracks of the subject audio; and
      determine whether the attribute of sound for the multiple audio tracks of the subject audio is substantially equivalent; and
   synchronize at least two portions of video substantially at the post-capture synchronization point,
   wherein the two portions of video are each captured at different multiple capture devices.

2. The non-transitory computer readable medium of claim 1, wherein the executable instructions to generate the post-capture synchronization point are configured to execute after the two portions of video are captured.

3. The non-transitory computer readable medium of claim 1, wherein to synchronize the at least two portions of video excludes implementing external synchronization information.

4. The non-transitory computer readable medium of claim 1, wherein to determine whether the attribute of sound for the multiple audio tracks of the subject audio is substantially equivalent, the executable instructions:
   compare waveform amplitudes of subsets of the multiple audio tracks of the subject audio; and
   match the waveform amplitudes to form at least the candidate synchronization point.

5. The non-transitory computer readable medium of claim 1, wherein to determine whether the attribute of sound for the multiple audio tracks of the subject audio is substantially equivalent, the executable instructions:
   compare waveform frequencies of subsets of the multiple audio tracks of the subject audio; and
   match waveform frequencies to form at least the candidate synchronization point.

6. The non-transitory computer readable medium of claim 1, further comprising executable instructions which, when executed by the computer, cause the computer to:
   certify that the candidate synchronization point is useable as the post-capture synchronization point to synchronize the at least two portions of video.

7. The non-transitory computer readable medium of claim 6, wherein to certify, the executable instructions:
   identify additional subsets of the multiple audio tracks of the subject audio for each of the two portions of video, the additional subsets defining points of reference;
   select other subsets of the multiple audio tracks of the subject audio at approximately the same amount of time units from the additional subsets;
   analyze an attribute of sound associated with the other subsets of the multiple audio tracks of the subject audio; and determine whether the attribute of sound for the other subsets of the multiple audio tracks of the subject audio is substantially equivalent.

8. The non-transitory computer readable medium of claim 1, wherein to synchronize the two portions of video excludes implementing either a synchronization signal or an artificial sound, or both.

9. A non-transitory computer readable medium storing executable instructions which, when executed by a computer, cause the computer to:
extract a reference audio and a specimen audio from content files in a repository;
characterize a portion of the reference audio in terms of an audio attribute to form a characterized portion of the reference audio;
determine whether the specimen audio includes the characterized portion of the reference audio to form a synchronization point; and
synchronize video clips associated with the reference audio and the specimen audio substantially at the synchronization point.

10. The non-transitory computer readable medium of claim 9, wherein the reference audio and the specimen audio include subject audio.

11. The non-transitory computer readable medium of claim 9, further comprising executable instructions which, when executed by the computer, cause the computer to:
edit the video clips associated with the reference audio and the specimen audio to form a video; and
implement as audible sound either the reference audio or the specimen audio, or both, in association with the video.

12. The non-transitory computer readable medium of claim 9, further comprising executable instructions which, when executed by the computer, cause the computer to:
synchronize the video clips based on the synchronization point for the reference audio and the specimen audio.

13. The non-transitory computer readable medium of claim 9, further comprising executable instructions which, when executed by the computer, cause the computer to:
designate a content file of a plurality of content files as including the reference audio as a function of an amount of data associated with the content file.

14. The non-transitory computer readable medium of claim 9, wherein to determine whether the specimen audio includes the characterized portion of the reference audio, the executable instructions:
characterize other portions of the reference audio to form other characterized portions of the reference audio; and
confirm that the specimen audio includes the other characterized portions of the reference audio.

15. The non-transitory computer readable medium of claim 9, further comprising executable instructions which, when executed by a computer, cause the computer to:
define a portion of the specimen audio as a vicinity range;
determine an alignment point for the portion of the reference audio; and
align the vicinity range at the alignment point.

16. The non-transitory computer readable medium of claim 9, wherein to determine whether the specimen audio includes the characterized portion of the reference audio, the executable instructions:
search for a pattern of the audio attribute associated with the characterized portion of the reference audio within a portion of the specimen audio;
establish a tolerance range for the pattern within which the portion of the specimen audio matches the pattern; and
generate a candidate synchronization point if at least a part of the portion of the specimen audio is within the tolerance range.

17. A device comprising:
a panel generator configured to generate one or more panels depicting audio-based synchronization points for synchronizing video; and
an audio synchronization point generator comprising:
a sound attribute analyzer configured to:
analyze waveform amplitudes associated with a first audio track and a second audio track that include a subject audio, and
a candidate synchronization point detector configured to:
detect that a portion of the first audio track and a portion of the second audio track includes substantially equivalent patterns of the waveform amplitudes.

18. The device of claim 17 wherein the audio synchronization point generator is configured to:
synchronize video clips based on the first audio track and the second audio track without synchronization information external to the subject audio.

19. The device of claim 17 wherein the panel generator is further configured to:
present an interactive panel configured to accept synchronization point generation parameters for governing the operation of the audio synchronization point generator.

20. A system comprising:
a memory configured to store instructions and data associated with storing a reference audio and a specimen audio from content files; and
logic configured to:
characterize a portion of the reference audio in terms of an audio attribute to form a characterized portion of the reference audio;
determine whether the specimen audio includes the characterized portion of the reference audio to form a synchronization point; and
synchronize video clips associated with the reference audio and the specimen audio substantially at the synchronization point.

21. A system, comprising:
a memory configured to store instructions and data associated with generating a candidate synchronization point as a function of a subject audio; and
a processor configured to:
generate a post-capture synchronization point as a function of a subject audio, the post-capture synchronization point specifying equivalent portions of the subject audio, wherein to generate the post-capture synchronization point the processor is configured to generate a candidate synchronization point with which to establish the post-capture synchronization point, and to generate the candidate synchronization point the processor is configured to:
analyze an attribute of sound associated with multiple audio tracks of the subject audio; and
determine whether the attribute of sound for the multiple audio tracks of the subject audio is substantially equivalent; and
synchronize at least two portions of video substantially at the post-capture synchronization point,
wherein the two portions of video are each captured at different multiple capture devices.

22. A method comprising:
extracting a reference audio and a specimen audio from content files in a repository;
characterizing a portion of the reference audio in terms of an audio attribute to form a characterized portion of the reference audio;
determining that the specimen audio includes the characterized portion of the reference audio to form a synchronization point; and
synchronizing video clips associated with the reference audio and the specimen audio substantially at the synchronization point.

23. A method, comprising:
generating a post-capture synchronization point as a function of a subject audio, the post-capture synchronization point specifying equivalent portions of the subject audio, wherein generating the post-capture synchronization point comprises generating a candidate synchronization point with which to establish the post-capture synchronization point;
certifying that the candidate synchronization point is useable as the post-capture synchronization point to synchronize the at least two portions of video; and
synchronizing at least two portions of video substantially at the post-capture synchronization point,
wherein the two portions of video are each captured at different multiple capture devices.

* * * * *